(12) United States Patent
Tchaitchian et al.

(10) Patent No.: US 7,562,070 B2
(45) Date of Patent: Jul. 14, 2009

(54) METHOD AND SYSTEM FOR AGGREGATING RULES THAT DEFINE VALUES FOR THE SAME PROPERTY ASSOCIATED WITH THE SAME DOCUMENT ELEMENT

(75) Inventors: Hessan Tchaitchian, Seattle, WA (US); Peter J. Spada, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 270 days.

(21) Appl. No.: 11/097,595

(22) Filed: Apr. 1, 2005

(65) Prior Publication Data
US 2006/0224607 A1    Oct. 5, 2006

(51) Int. Cl.
G06F 17/30 (2006.01)
(52) U.S. Cl. .................................. 707/3; 707/4; 707/101
(58) Field of Classification Search ....................... 707/1, 707/2, 3, 4, 100, 101, 104.1
See application file for complete search history.

(56) References Cited

U.S. PATENT DOCUMENTS 5,832,505 A    11/1998  Kasso et al. ................. 707/104
2004/0133855 A1 *  7/2004  Blair et al. ................... 715/517
2005/0050000 A1 *  3/2005  Kwok et al. ................... 707/1
2006/0069920 A1 *  3/2006  Jolley ......................... 713/182

FOREIGN PATENT DOCUMENTS

WO    WO 2005/003998    1/2005

OTHER PUBLICATIONS

Greg Badros et al., "Constraint Cascading Style Sheets for the Web", 1999, ACM, pp. 73-82.*

* cited by examiner

Primary Examiner—Hosain T Alam
Assistant Examiner—Johnese Johnson
(74) Attorney, Agent, or Firm—Merchant & Gould; Ryan T. Grace

(57) ABSTRACT

An aggregate property grid includes a rule list and a property list such that a web developer may easily determine which properties correspond to which rules. The rule list displays a list of rules that are applied to a selected document element. The property list includes the properties that are applied to the selected document element. Different rules associated with the selected document element may be aggregated such that only the properties that are applied to the document element are displayed in the property list. Conflicting properties may be merged according to a prioritized hierarchy such that each conflicting property may have a higher or lower precedence compared to the other conflicting properties.

13 Claims, 3 Drawing Sheets

METHOD AND SYSTEM FOR AGGREGATING RULES THAT DEFINE VALUES FOR THE SAME PROPERTY ASSOCIATED WITH THE SAME DOCUMENT ELEMENT

BACKGROUND

Cascading style sheets (CSS) provide web site developers with control over the visual appearance, style (e.g., size, color, font, margins, borders, backgrounds, etc.), and positioning of text in web pages without compromising the structure of the page. Developers may use CSSs to create templates for attaching style properties and rules to structured documents (e.g., hypertext markup language (HTML) documents and extensible markup language (XML) applications). CSSs separate the presentation style of documents from document content thereby simplifying web authoring and site maintenance. CSSs may include instructions in the code of a web site that describe how a browser should render any instance of a particular element on a page. For example, style sheets can provide instructions for how all of the hypertext, headers, links, or text should appear.

The style sheets are referred to as cascading because multiple style sheets can be applied to the same web page. The style of a web page may be rendered from multiple sources with an established order of precedence where the definitions of any style element conflict. For example, some text may be rendered in accordance with properties defined for a first style rule. The text may be rendered in accordance with a hierarchical arrangement of other style rules that include properties that are not defined for the first style rule.

SUMMARY

The present disclosure is directed to a method and system for aggregating rules that define values for the same property associated with the same document element. An aggregate property grid includes a rule list and a property list such that a web developer may easily determine which properties correspond to which rules. The rule list displays a list of rules that are applied to a selected document element. The property list includes the properties that are applied to the selected document element. Different rules associated with the selected document element may be aggregated such that only the properties that are applied to the document element are displayed in the property list. Properties that are not defined for the selected document element are not displayed in the property list.

The property list may include inherited and overridden properties, and highest precedent styles for conflicting properties that have defined values. A property conflict occurs when multiple rules are applied to the same document element and the rules define different values for the same property. Conflicting properties may be merged according to a prioritized hierarchy such that each conflicting property may have a higher or lower precedence compared to the other conflicting properties. The conflicting properties are displayed in the property list but lower precedent properties have a strikethrough in the property name. The developer may select a property in the property list and the corresponding style rule is highlighted in the rule list. The developer may modify properties directly in the aggregate property grid and the modifications are implemented in the corresponding rule.

In accordance with one aspect of the invention, a rule list is generated. The rule list includes the rules that are applied to a document element. Properties that are defined for each rule are determined. Conflicting properties are merged according to a prioritized hierarchy. The property having the highest precedence in the prioritized hierarchy overrides the conflicting properties having a lower precedence. A property list is generated. The property list includes the properties that are defined for the document element. An aggregate property grid is displayed. The aggregate property grid comprises the rule list and the property list.

Other aspects of the invention include system and computer-readable media for performing these methods. The above summary of the present disclosure is not intended to describe every implementation of the present disclosure. The figures and the detailed description that follow more particularly exemplify these implementations.

DETAILED DESCRIPTION OF THE PREFERRED EMBODIMENT

The present disclosure is directed to a method and system for aggregating rules that define values for the same property associated with the same document element. An aggregate property grid includes a rule list and a property list such that a web developer may easily determine which properties correspond to which rules. The rule list displays a list of rules that are applied to a selected document element. The property list includes the properties that are applied to the selected document element. Different rules associated with the selected document element may be aggregated such that only the properties that are applied to the document element are displayed in the property list. A property conflict occurs when multiple rules are applied to the same document element and the rules define different values for the same property. Conflicting properties may be merged according to a prioritized hierarchy such that each conflicting property may have a higher or lower precedence compared to the other conflicting properties.

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
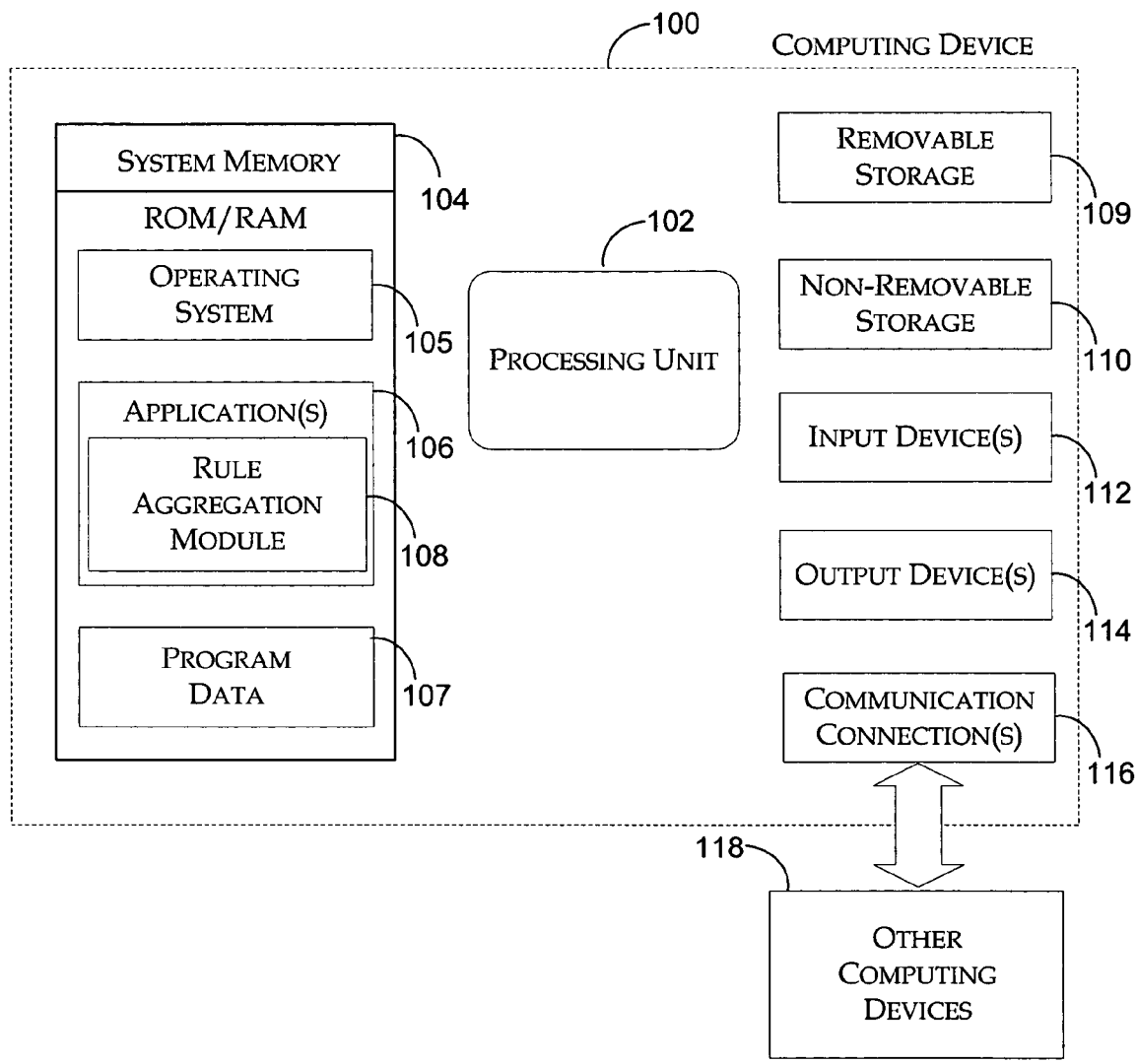
FIG. 1 illustrates a computing device that may be used according to an example embodiment of the present invention.
Figure 2:
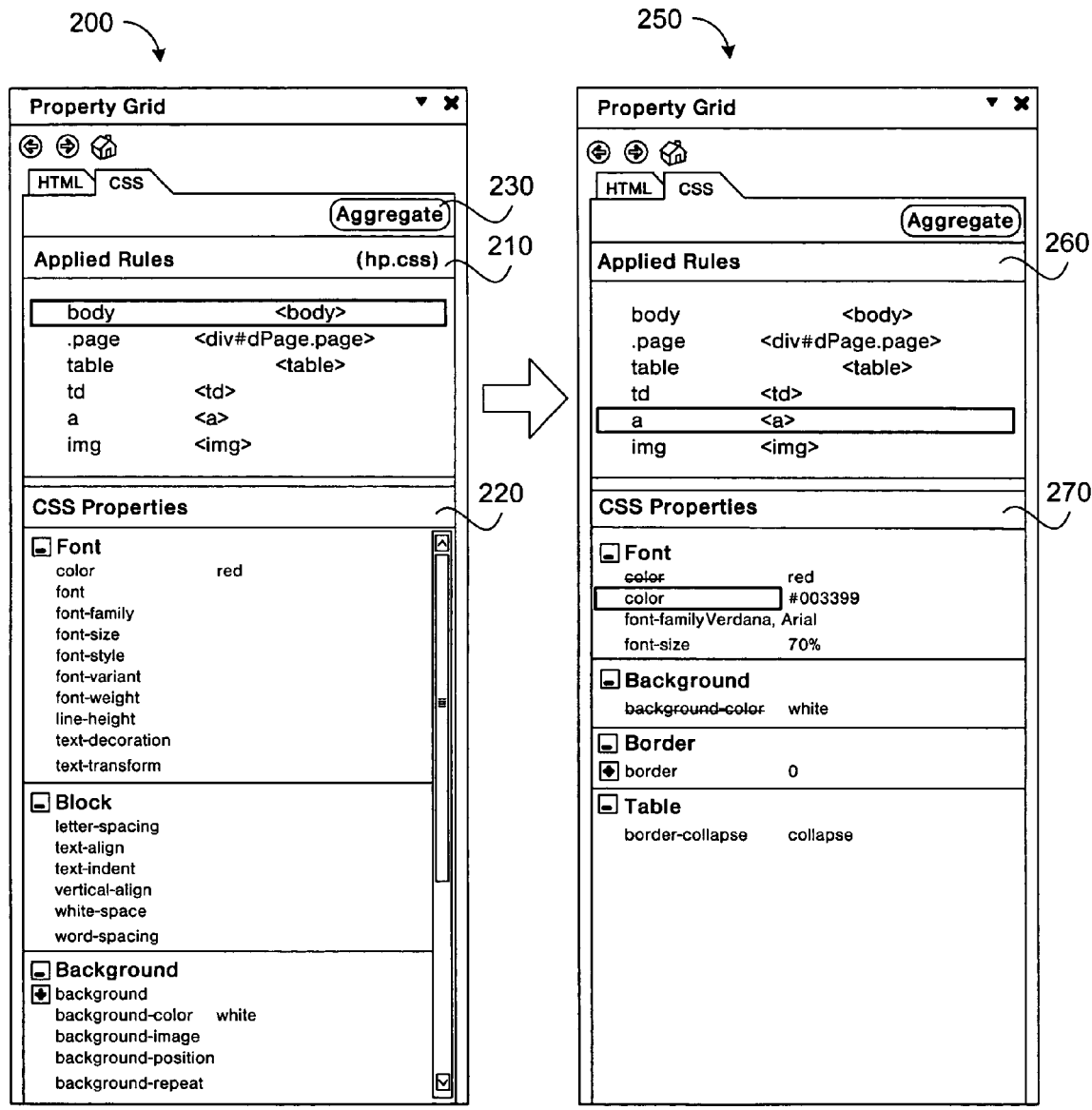
FIG. 2 illustrates example user interface screenshots of property grids, in accordance with at least one feature of the present invention.
Figure 3:
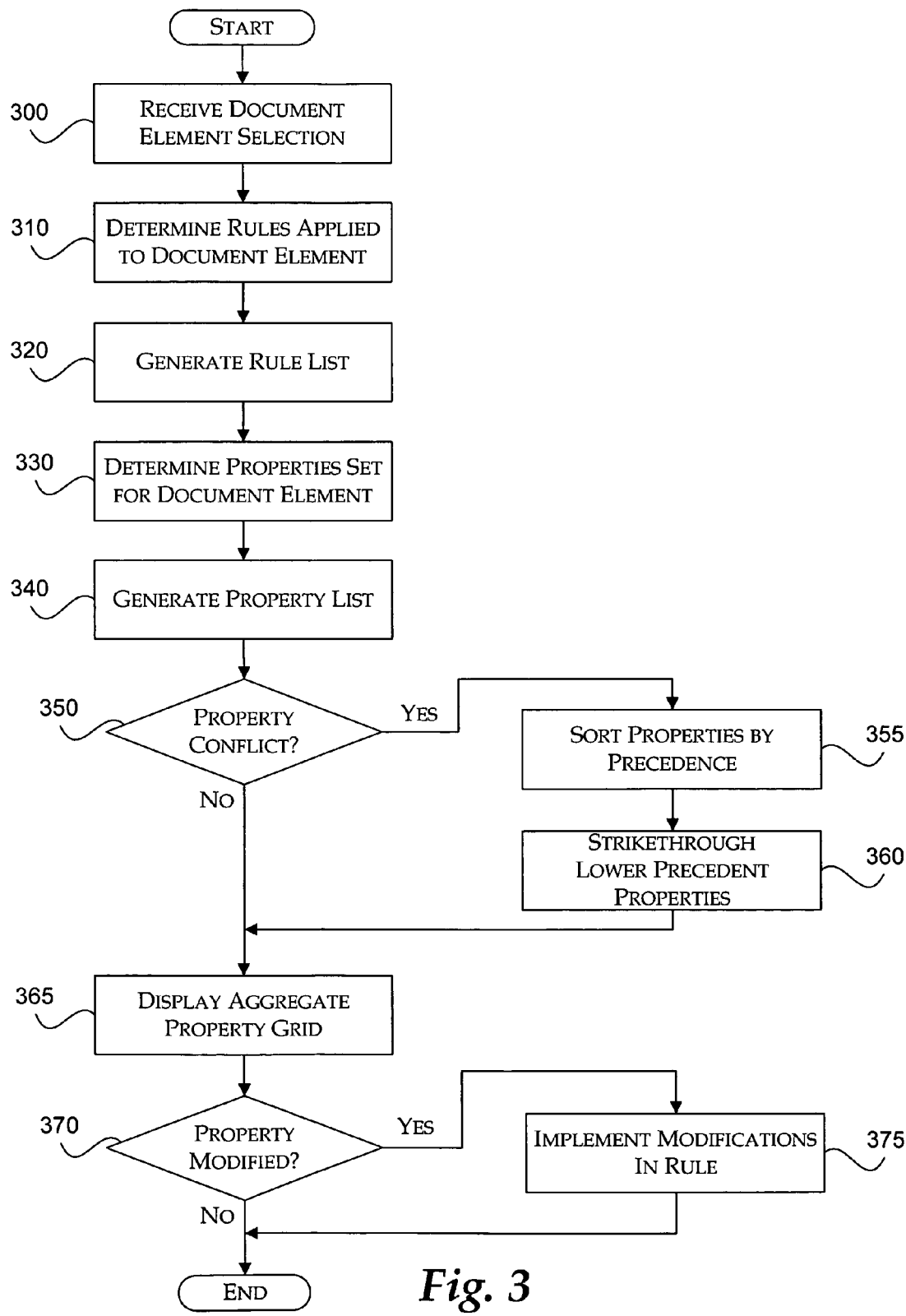
FIG. 3 illustrates an operational flow diagram illustrating a process for aggregating rules that define values for the same property associated with the same document element, in accordance with at least one feature of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A rule aggregation module 108, which is described in detail below with reference to FIGS. 2 and 3, is implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Aggregating Rules that Define Values for the Same Property associated with the Same Document Element The present disclosure is described in the general context of computer-executable instructions or components, such as software modules, being executed on a computing device. Generally, software modules include routines, programs, objects, components, data structures, and the like that perform particular tasks or implement particular abstract data types. Although described here in terms of computer-executable instructions or components, the invention may equally be implemented using programmatic mechanisms other than software, such as firmware or special purpose logic circuits.

A cascading style sheet (CSS) includes style rules that inform a browser how to render a document on a web page. A style element that contains the style rules for the page may be placed in the document head. Each rule includes a CSS selector and the style to be applied to the CSS selector. CSS selectors are expressions that may be used to match mark-up language document elements. Style rules may be formed using the following expression: selector{property:value}. Multiple style definitions for a single selector may be separated by a semicolon. For example, selector {property1: value1; property2:value2}.

Sometimes a style rule does not define every property. For example, the following CSS code segment defines font, font-size and color properties for style rule SR1, and font-size and border properties for style rule SR2:

```
<HEAD>
    <TITLE>CSS Example</TITLE>
    <STYLE TYPE="text/css">
        .SR1 {font: arial; font-size: 24pt; color: red}
        .SR2 {font-size: 12pt; border: 3px }
    </STYLE>
</HEAD>
```

The above CSS rules inform the browser to display elements that match .SR1 in 24 point, red Arial font. Elements that match .SR2 are displayed in 12 point font with a 3 pixel wide border.

In another example, the style rules may be applied to a line of text in a body of the document. Style rules may also be combined such that property values are merged as shown in the following CSS code segment.

```
<BODY>
    <p class=SR1>line of text 1</p>
    <p class=SR2>line of text 2</p>
    <p class="SR1 SR2">line of text 3</p>
<BODY>
```

The properties defined in style rule SR1 are applied to "line of text 1" (e.g., 24 point, red Arial font). The properties defined in style rule SR2 are applied to "line of text 2" (e.g., 12 point font with a 3 pixel wide border). "line of text 3" is displayed with properties merged from style rules SR1 and SR2. In this example, style rule SR2 overrides style rule SR1 because style rule SR2 appears after style rule SR1. Thus, "line of text 3" is displayed in 12 point, red Arial font with a 3 pixel wide border.

FIG. 2 illustrates example user interface screenshots for a non-aggregate property grid and an aggregate property grid. A web developer may access a property grid associated with the CSS to identify and edit properties associated with the document. The developer may select a document element and view the property grid to determine the rules and properties that are applied to the selected document element. The document element may be any object in the document (e.g., text, an image, a table, etc.) Non-aggregate property grid 200 includes rule list 210 that shows which rules are applied to the document (e.g., body, .page, table, td, a, and img). Non-aggregate property grid 200 includes property list 220 that displays a list of all CSS properties that may be defined for any style rule. The properties that are defined for the selected style rule in rule list 210 are identified. As shown in the figure, <body> is defined with font color=red and background color=white. The developer may select any rule listed in rule list 210 to identify the defined properties in property list 220. The developer may also select any property in property list 220 to define for the selected rule in rule list 210.

In a complex page with multiple styles, rule list 210 may be quite long. Thus, the web developer may be unable to decipher interactions that may occur between several different style rules. The developer may have difficulty determining which rule has a specific property set and whether the rule applies to the selected document element. For example, a document element may be associated with multiple style rules. One of the rules defines a specific property (e.g., text color). The developer must review each style that applies to the document element one-by-one to determine which rule defines the property. If the same property is specified in more than one rule, the developer cannot determine which property overrides the others without viewing the properties for every rule.

The web developer may aggregate the different rules associated with a selected document element such that only the properties that are applied to the document element are displayed in the property grid. Thus, the web developer need not view each rule individually to determine the applied rules and the defined properties. The web developer may initiate rule aggregation by selecting aggregate button 230. Selecting aggregate button 230 causes aggregate property grid 250 to be displayed on the user interface. Aggregate property grid 250 includes rule list 260 and property list 270. Rule list 260 displays a list of rules that are applied to the selected document element. Property list 270 displays a list of defined properties for the selected document element. Thus, property list 270 provides a high-level view of the rules and properties associated with the selected document element. The web developer may edit properties directly from property list 270. Properties that are not defined for the selected document element are not displayed in property list 270.

Rule aggregation provides the web developer with a tool to easily determine which properties correspond to which rules. The developer may select a property in property list 270 and the corresponding style rule is highlighted in rule list 260. For example, the developer may select the "color" property in property list 270. The "color" property is defined in style rule "<a>". Thus, "<a>" appears with a border in rule list 260 to indicate which rule defined the property. In one embodiment, the first aggregated property in property list 270 is selected when the developer initiates rule aggregation.

Property list 270 may include inherited and overridden properties, and highest precedent styles for conflicting properties that have defined values. For example, two rules are applied to a selected document element that define different values for the same property (i.e., a property conflict). Both rules are included in rule list 260. The corresponding properties are displayed in property list 270 but the property having lower precedence (i.e., the overridden property) may have a strikethrough in the property name. As shown in the figure, the color property corresponding to "red" is shown as strikethrough text because the color property corresponding to color #003399 has a higher precedence. Similarly, the background color property corresponding to "white" is shown as strikethrough text because background color is not an inherited property. The developer may select the lower precedent property in property list 270 such that the corresponding rule(s) is highlighted in rule list 260.

The developer may modify properties directly from property list 270 and the modifications are implemented in the corresponding rule. For example, the developer may delete the higher precedent property (e.g., color=#003399) such that the lower precedent property (e.g., color=red) is applied to the document element and the strikethrough is removed from the property name. Identical properties are sorted in property list 270 such that lower precedent properties are displayed above higher precedent properties. Selecting a rule in rule list 260 while in aggregate mode disables rule aggregation such that non-aggregate property grid 200 is displayed on the user interface.

In one embodiment, aggregate mode is available when working within a <BODY> tag of a mark-up language page and is disabled otherwise. A developer may exit the aggregate mode by selecting a document element outside the <BODY> tag. Selection inside <SCRIPT> or <STYLE> blocks embedded within <BODY> tags may be interpreted as being outside the <BODY> tag.

FIG. 3 illustrates an operational flow diagram illustrating a process for aggregating rules that define values for the same property associated with the same document element. The process begins at a start block where a mark-up language document is associated with cascading style sheets. CSS style rules are established with property values that define how the document is rendered on a web page.

Selection of a document element is received at block 300. The document element may be any object in the document. In one embodiment, the document is a mark-up language document (e.g., HTML, XML, etc.).

Moving to block 310, style rules that are applied to the selected document element are determined. Multiple rules may be combined such that property values are merged. The properties are established according to a prioritized hierarchy such that each merged property may have a higher or lower precedence compared to other merged properties. Proceeding to block 320, a rule list is generated. The rule list includes the rules that are applied to the selected document element.

Advancing to block 330, properties that are defined for the document element are determined. A property may be inherited from another rule when a property value is not defined. Transitioning to block 340, a property list is generated. The property list includes the properties that are applied to the selected document element. The property list may include properties that have been inherited or overridden. Properties that are not defined for the document element are not included in the property list.

Continuing to decision block 350, a determination is made whether any of the properties conflict. A property conflict occurs when two or more rules are applied to the same document element and the rules define different values for the same property. If none of the properties conflict, processing proceeds to block 365. If there is a property conflict, processing continues at block 355.

Moving to block 355, the properties are sorted according to precedence established by the prioritized hierarchy. In one embodiment, properties that are defined later in CSS code have a higher precedence than properties that are defined earlier in the CSS code. Proceeding to block 360, a strikethrough format is applied to property names in the property list that correspond to the lower precedent properties.

Advancing to block 365, an aggregate property grid is displayed. In one embodiment, the web developer causes the property grid to be displayed by selecting an aggregate button from a user interface. The aggregate property grid includes the rules list and the property list. The property list is displayed with the names of all of the properties that apply to the selected document element. In one embodiment, any property names corresponding to lower precedent properties are displayed in the strikethrough format such that the web developer may determine that the lower precedent property is not applied to the document element. The aggregate property grid allows a web developer to easily determine which properties correspond to which rules. The web developer may select a property name in the property list and the corresponding rule is highlighted in the rule list.

Transitioning to decision block 370, a determination is made whether any of the properties have been modified. The web developer may edit properties directly from the property list displayed in the aggregate property grid. If any of the properties have been modified, processing proceeds to block 375 where the property modifications are implemented in the corresponding rule. If none of the properties have been modified, processing terminates at an end block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for aggregating rules that define values, comprising:
    receiving a first declaration of a first style rule of a cascading style sheet in a mark-up language document, wherein the first declaration of the first style rule includes a first selector declaration and a first style definition associated with the first selector, wherein the first style definition includes first properties indicated with first values for rendering the first properties;
    receiving a second declaration of a second style rule of the cascading style sheet in the mark-up language document, wherein the second declaration of the second style rule includes a second selector declaration and a second style definition associated with the second selector, wherein the second style definition includes second properties indicated with second values for rendering the second properties, wherein the first declaration of the first style rule and the second declaration of the second style rule form a prioritized hierarchy in the mark-up language document;
    displaying, within a user interface, a property grid, wherein the property grid includes the first and second style rules in association with a property list that identifies a list of properties associated with the values of the style rules for the first style rule and for the second style rule;
    receiving a selection, within the user interface, to aggregate the first values of the first style rule and the second values in the second style rule to generate an aggregate property grid, wherein conflicting values of properties indicated in the first style rule and the second style rule are merged according to the prioritized hierarchy of the mark-up language document, wherein the values of the second style rule in the prioritized hierarchy overrides conflicting values of the first style rule of the prioritized hierarchy; and
    displaying, within the user interface, the aggregate property grid, wherein the aggregate property grid includes a display property list that identifies a list of properties for rendering according to the prioritized hierarchy of the mark-up language document, wherein values in the first style rule in the prioritized hierarchy that are overridden by values of the second style rule are marked in the aggregate property grid with an override indicator, wherein overridden values are selectable to negate the override.

2. The computer-implemented method of claim 1, wherein the override indicator is a strikethrough.

3. The computer-implemented method of claim 1, further comprising receiving a property selection in the property list.

4. The computer-implemented method of claim 3, further comprising highlighting a style rule in the rule list that corresponds to the selected property in the property list.

5. The computer-implemented method of claim 1, further comprising receiving a modification to a property in the aggregate property grid.

6. The computer-implemented method of claim 5, further comprising implementing the modification in a style rule that corresponds to the modified property.

7. The computer-implemented method of claim 1, wherein the property list comprises inherited properties.

8. A system for aggregating rules that define values, comprising:
    a processor; and
    a memory having computer-executable instructions associated therewith, the instructions being configured to:
        receive a first declaration of a first style rule of a cascading style sheet in a mark-up language document, wherein the first declaration of the first style rule includes a first selector declaration and a first style definition associated with the first selector, wherein the first style definition includes first properties indicated with first values for rendering the first properties;
        receive a second declaration of a second style rule of the cascading style sheet in the mark-up language document, wherein the second declaration of the second style rule includes a second selector declaration and a second style definition associated with the second selector, wherein the second style definition includes second properties indicated with second values for rendering the second properties, wherein the first declaration of the first style rule and the second declaration of the second style rule form a prioritized hierarchy in the mark-up language document;
        display, within a user interface, a property grid, wherein the property grid includes the first and second style rules in association with a property list that identifies a list of properties associated with the values of the style rules for the first style rule and for the second style rule;
        receive a selection, within the user interface, to aggregate the first values of the first style rule and the second values in the second style rule to generate an aggregate property grid, wherein conflicting values of properties indicated in the first style rule and the second style rule are merged according to the prioritized hierarchy of the mark-up language document, wherein the values of the second style rule in the prioritized hierarchy overrides conflicting values of the first style rule of the prioritized hierarchy; and
        display, within the user interface, the aggregate property grid, wherein the aggregate property grid includes a display property list that identifies a list of properties for rendering according to the prioritized hierarchy of the mark-up language document, wherein values in the first style rule in the prioritized hierarchy that are overridden by values of the second style rule are marked in the aggregate property grid with an override indicator, wherein overridden values are selectable to negate the override.

9. The system of claim 8, wherein the instructions are further configured to:
   receive a modification to a property in the aggregate property grid; and
   implement the modification in the style rule that corresponds to the modified property.

10. The system of claim 8, wherein the instructions are further configured to:
    receive a property selection in the property list; and
    highlight the style rule that corresponds to the selected property in the property list.

11. A computer-readable storage medium having computer-executable instructions for aggregating values when executed on a processor, the instructions comprising:
    receiving a first declaration of a first style rule of a cascading style sheet in a mark-up language document, wherein the first declaration of the first style rule includes a first selector declaration and a first style definition associated with the first selector, wherein the first style definition includes first properties indicated with first values for rendering the first properties;
    receiving a second declaration of a second style rule of the cascading style sheet in the mark-up language document, wherein the second declaration of the second style rule includes a second selector declaration and a second style definition associated with the second selector, wherein the second style definition includes second properties indicated with second values for rendering the second properties, wherein the first declaration of the first style rule and the second declaration of the second style rule form a prioritized hierarchy in the mark-up language document;
    displaying, within a user interface, a property grid, wherein the property grid includes the first and second style rules in association with a property list that identifies a list of properties associated with the values of the style rules for the first style rule and for the second style rule;
    receiving a selection, within the user interface, to aggregate the first values of the first style rule and the second values in the second style rule to generate an aggregate property grid, wherein conflicting values of properties indicated in the first style rule and the second style rule are merged according to the prioritized hierarchy of the mark-up language document, wherein the values of the second style rule in the prioritized hierarchy overrides conflicting values of the first style rule of the prioritized hierarchy; and
    displaying, within the user interface, the aggregate property grid, wherein the aggregate property grid includes a display property list that identifies a list of properties for rendering according to the prioritized hierarchy of the mark-up language document, wherein values in the first style rule in the prioritized hierarchy that are overridden by values of the second style rule are marked in the aggregate property grid with an override indicator, wherein overridden values are selectable to negate the override.

12. The computer-readable storage medium of claim 11, further comprising:
    receiving a property selection in the property list; and
    highlighting the style rule that corresponds to the selected property in the property list.

13. The computer-readable storage medium of claim 11, further comprising:
    receiving a modification to a property in the aggregate property grid; and
    implementing the modification in the style rule that corresponds to the modified property.

* * * * *